United States Patent [19]
Okimoto et al.

[11] Patent Number: 5,197,287
[45] Date of Patent: Mar. 30, 1993

[54] EXHAUST CONTROL SYSTEM FOR ENGINE WITH TURBOCHARGERS

[75] Inventors: Haruo Okimoto; Seiji Tashima; Akihrio Nakamoto; Ikuo Onimura, all of Hiroshima, Japan

[73] Assignee: Mazda Motor Corporation, Hiroshima, Japan

[21] Appl. No.: 575,008

[22] Filed: Aug. 30, 1990

[30] Foreign Application Priority Data

Aug. 31, 1989 [JP] Japan .................... 1-227910

[51] Int. Cl.$^5$ ............................ F02B 37/12
[52] U.S. Cl. ........................ 60/612; 60/600
[58] Field of Search ............... 60/600, 601, 602, 603, 60/612

[56] References Cited

U.S. PATENT DOCUMENTS

| 4,793,140 | 12/1988 | Esch | 60/600 |
| 5,020,327 | 6/1991 | Tashima et al. | 60/612 |

FOREIGN PATENT DOCUMENTS 41417 4/1981 Japan .
160022 9/1984 Japan .
191818 7/1990 Japan .................... 60/612

Primary Examiner—Michael Koczo
Attorney, Agent, or Firm—Sixbey, Friedman, Leedom & Ferguson

[57] ABSTRACT

An engine is provided with a primary turbocharger and a secondary turbocharger having blowers disposed in the intake passage of the engine in parallel to each other and turbines disposed in the exhaust passage of the engine in parallel to each other. An exhaust cutoff valve disposed in the exhaust passage opens to feed exhaust gas to the turbine of the secondary turbocharger to operate the secondary turbocharger only in a large intake air mass range. A waste gate valve opens to relieve exhaust gas fed to the turbochargers when the supercharging pressure exceeds a predetermined value. The waste gate valve is kept closed for a predetermined time after the operating condition of the engine shifts into the large intake air mass range and the exhaust cutoff valve opens when shift of the operating condition of the engine from a small intake air mass range to the large intake air mass range is required.

8 Claims, 9 Drawing Sheets

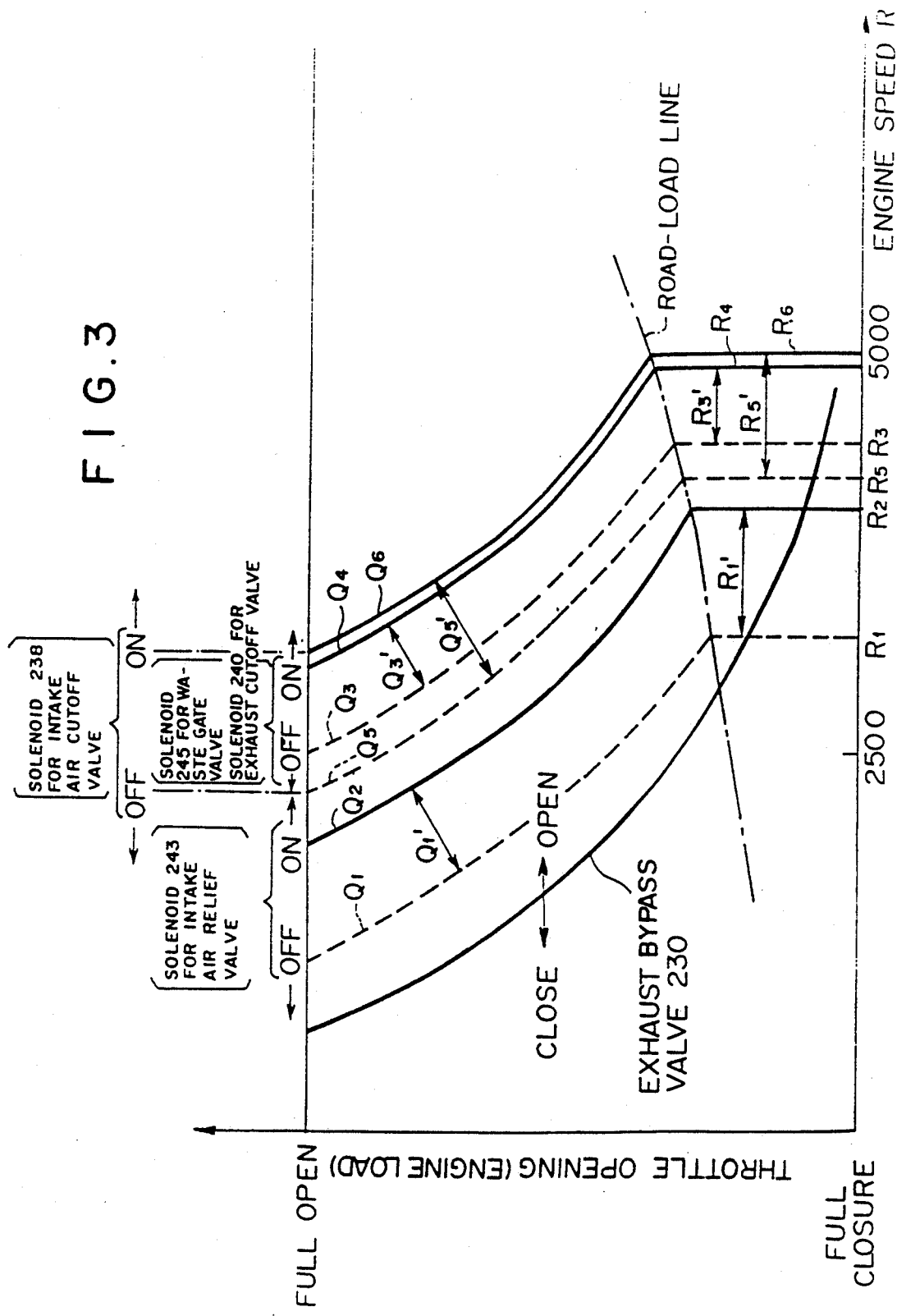

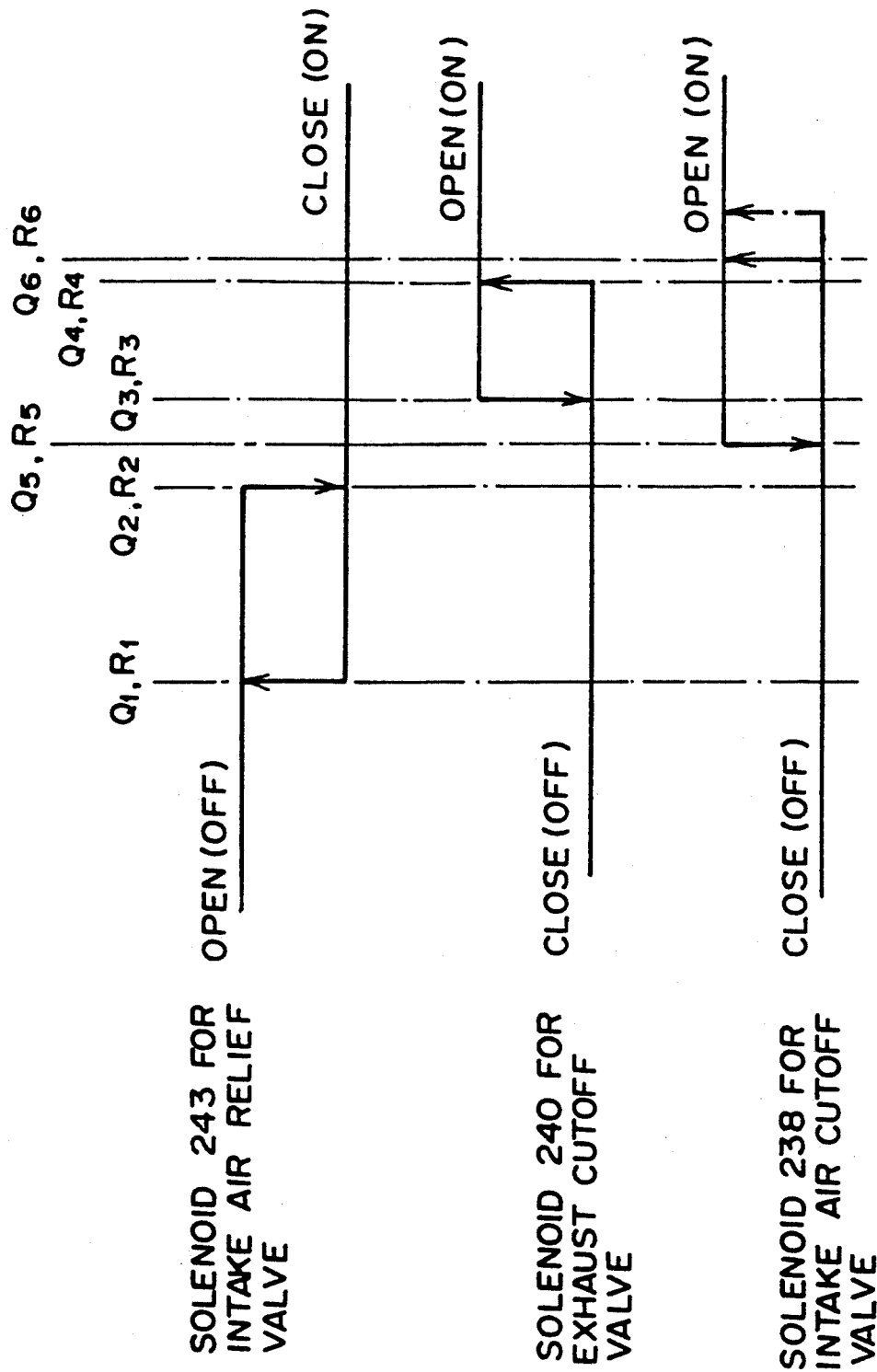

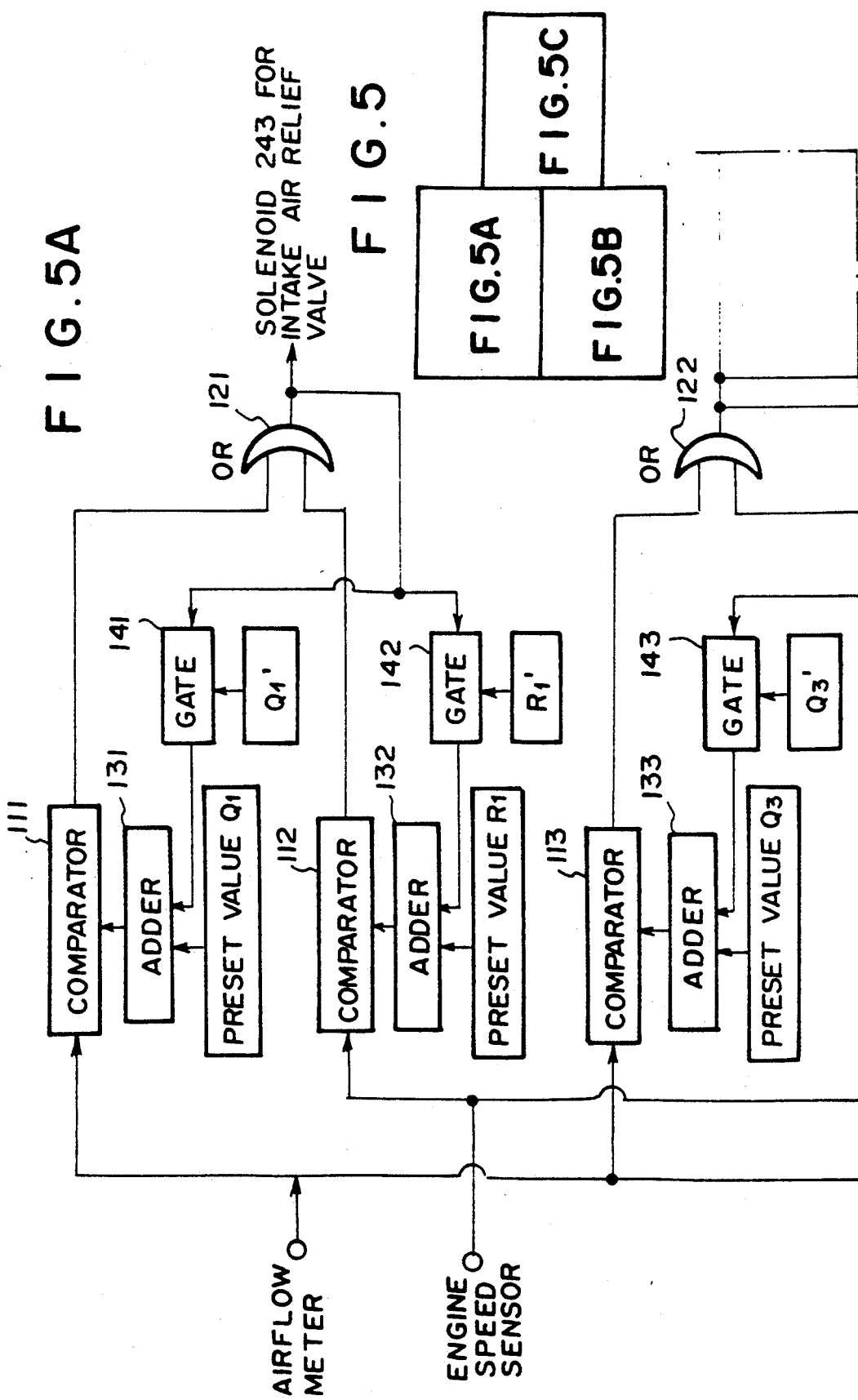

EXHAUST CONTROL SYSTEM FOR ENGINE WITH TURBOCHARGERS

BACKGROUND OF THE INVENTION

1. Field of the Invention

This invention relates to an exhaust control system for an engine with turbochargers, and more particularly to an exhaust control system for an engine which is provided with a plurality of turbochargers and in which a part of the turbochargers are operated solely in the operating range of the engine where the intake air mass flow is relatively large.

2. Description of the Prior Art

As disclosed, for instance, in Japanese Unexamined Utility Model No. 60(1985)-178329, there has been known an engine which is provided with a pair of turbochargers, a primary turbocharger and a secondary turbocharger. In the engine, the turbines of the turbochargers are disposed in parallel in an exhaust passage and the blowers of the turbochargers are connected to an intake passage of the engine. An exhaust cutoff valve is provided in the exhaust passage upstream of the turbine of the secondary turbocharger and is closed in a small intake air mass range where the intake air mass flow is smaller than a preset value, thereby making inoperative the secondary turbocharger and concentrating exhaust gas from the exhaust passage to the turbine of the primary turbocharger in order to ensure a high supercharging pressure. On the other hand, in a large intake air mass range where the intake air mass flow is larger than a preset value, the exhaust cutoff valve is opened so that exhaust gas from the exhaust passage is fed to the turbines of both the turbochargers thereby causing the secondary turbocharger to operate together with the primary turbocharger and obtaining a proper supercharging pressure.

In order to optimize the supercharging pressure characteristic curve in such an engine provided with a pair of turbochargers, a waste gate valve is provided in a waste gate passage which is provided in the exhaust passage and bypasses the turbine of the primary turbocharger and the waste gate valve is opened to relieve a part of the exhaust gas fed to the primary turbocharger when the pressure of intake air in the intake passage downstream of the blower of the primary turbocharger becomes not lower than a predetermined value.

In such a turbocharged engine with a waste gate valve, there has been a problem that at a time the operating condition of the engine shifts from the small intake air mass range to the large intake air mass range (e.g., during acceleration), it takes a long time for the rotational speed of the secondary turbocharger to increase to a level at which the supercharging effect can be obtained since the secondary turbocharger has been stopped or has been rotating at a very low speed until that time, and accordingly the vehicle cannot be satisfactorily accelerated.

SUMMARY OF THE INVENTION

In view of the foregoing observations and description, the primary object of the present invention is to provide an exhaust control system for an engine with turbochargers in which the pressure of exhaust gas fed to the secondary turbocharger is properly increased at a time the operating condition of the engine shifts from the small intake air mass range to the large intake air mass range so that the rotational speed of the secondary turbocharger is quickly increased without generating torque shock which is apt to occur when the pressure of exhaust gas becomes excessively high.

In accordance with the present invention, there is provided an exhaust control system for an engine provided with at least one primary turbocharger and at least one secondary turbocharger, the primary turbocharger and the secondary turbocharger having blowers disposed in the intake passage of the engine in parallel to each other and turbines disposed in the exhaust passage of the engine in parallel to each other, and with an exhaust cutoff valve which is disposed in the exhaust passage and opens to feed exhaust gas to the blower of the secondary turbocharger to operate the secondary turbocharger only in a large intake air mass range, and a waste gate valve which opens and closes according to the supercharging pressure and opens to relieve exhaust gas fed to the turbochargers when the supercharging pressure exceeds a predetermined value, characterized by having a relief inhibiting means which keeps the waste gate valve closed for a predetermined time after the operating condition of the engine shifts into the large intake air mass range and the exhaust cutoff valve opens when shift of the operating condition of the engine from a small intake air mass range to the large intake air mass range is required.

BRIEF DESCRIPTION OF THE DRAWINGS

FIG. 3 is a map showing the operating range of the exhaust cutoff valve, the intake air cutoff valve, the intake air relief valve, the waste gate valve and the exhaust bypass valve, FIG. 4 shows the timing the intake air cutoff valve, the exhaust cutoff valve and the intake air relief valve are opened and closed, FIG. 5, 5A, 5B, and 5C are a circuit diagram of the control unit.

DESCRIPTION OF THE PREFERRED EMBODIMENT

Figure 1:
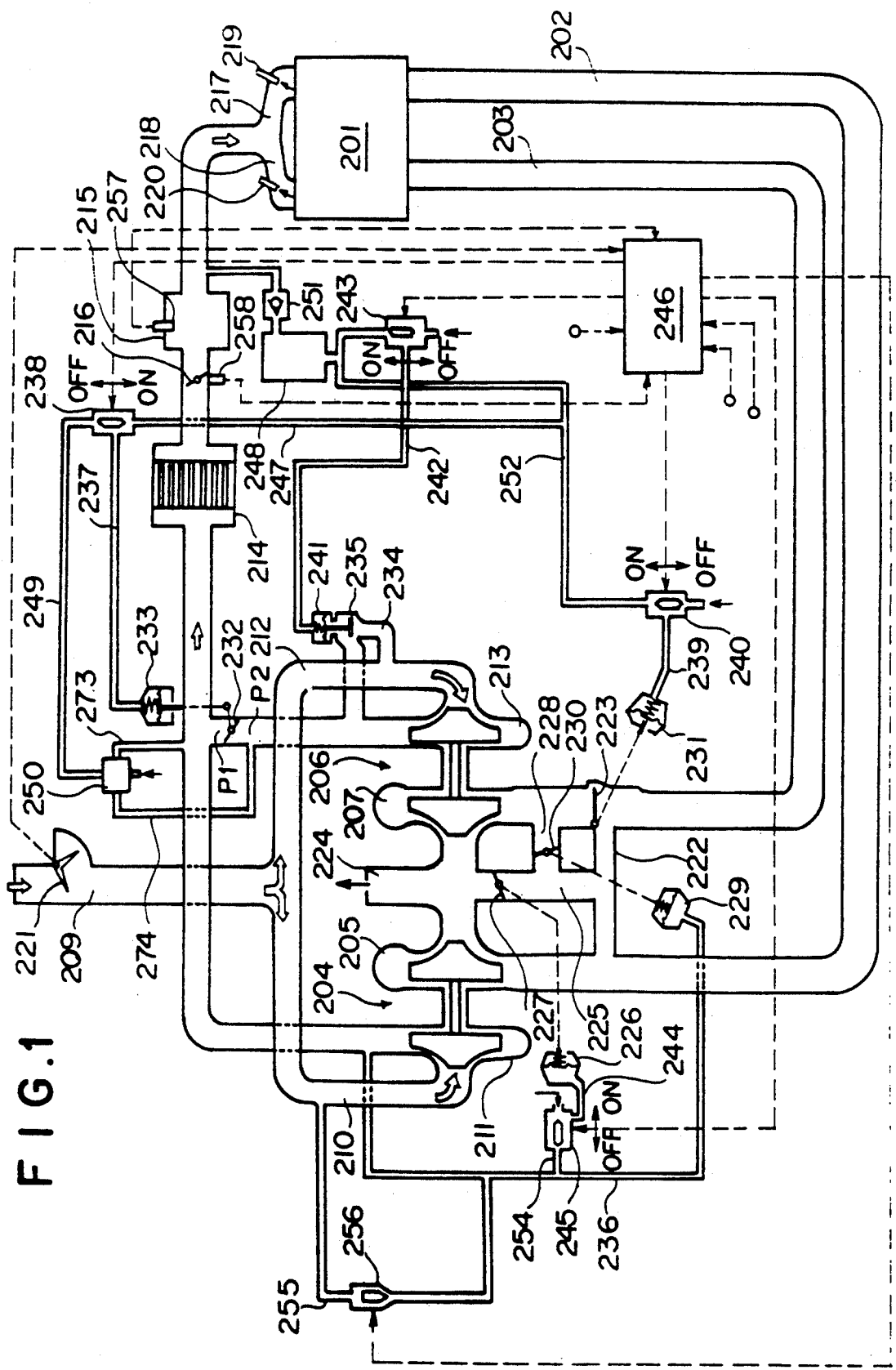
FIG. 1 is a schematic view showing an engine provided with an exhaust control system in accordance with an embodiment of the present invention.

In FIG. 1, a two-rotor rotary engine 201 has a pair of exhaust passages 202 and 203, one for each cylinder, which are separated from each other. In the exhaust passage 202 is disposed a turbine 205 of a primary turbocharger 204, and in the exhaust passage 203 is disposed a turbine 207 of a secondary turbocharger 206. That is, by separately leading the exhaust passages 202 and 203 for the respective cylinders to the turbines 205 and 207 of the primary and secondary turbochargers 204 and 206, the dynamic pressure of exhaust gas is caused to effectively act on the turbines 205 and 207 of the primary and secondary turbochargers 204 and 206 in the operating range of the engine 201 where both the turbochargers 204 and 206 are to operate, whereby the supercharging efficiency is improved. The exhaust passages 202 and 203 merge together into a common exhaust passage 224.

A common intake passage 209 branches into first and second branch intake passages 210 and 212 at a portion downstream of an air cleaner (not shown), and blowers 211 and 213 of the primary and secondary turbochargers 204 and 206 are respectively disposed in the first and second branch intake passages 210 and 212. The first and second branch intake passages 210 and 212 extend substantially in right opposite directions at their upstream end portions and merges together into the downstream portion of the common intake passage 209 at their downstream end portions. An intercooler 214, a throttle valve 216 and a surge tank 215 are disposed in the downstream portion of the common intake passage 209 in this order from the upstream end of the common intake passage 209 to the downstream end of the common intake passage 209. A throttle sensor 258 for detecting the throttle opening is connected to the throttle valve 216. Further the downstream portion of the common intake passage 209 branches into a pair of discrete intake passages 217 and 218 at the downstream end portion. The discrete intake passages 217 and 218 are connected to intake ports (not shown) of the respective cylinders. Fuel injection valves 219 and 220 are respectively disposed in the discrete intake passages 17 and 218.

An airflow meter 221 is provided in the upstream portion of the common intake passage 209, and the surge tank 215 is provided with a pressure sensor 257 which detects the supercharging pressure.

The exhaust passages 202 and 203 communicates with each other by way of a communicating passage 222 relatively small in cross-section at a portion upstream of the primary and secondary turbochargers 204 and 205. An exhaust cutoff valve 223 is disposed in the exhaust passage 203, in which the turbine 207 of the secondary turbocharger 205, at a portion immediately downstream of the portion at which the communicating passage 22 opens. A waste gate passage 225 extends from an intermediate portion of the communicating passage 222 to the common exhaust passage 224 and is provided with a waste gate valve 227 which is driven by a diaphragm type actuator 226. An exhaust bypass passage 228 communicates the portion of the waste gate passage 225 upstream of the waste gate valve 227 with the portion of the exhaust passage 203 downstream of the exhaust cutoff valve 223, and is provided with an exhaust bypass valve 230 which is driven by a diaphragm type actuator 229.

The exhaust cutoff valve 223 is driven by a diaphragm type actuator 231. An intake air cutoff valve 232 is disposed in the second branch intake passage 212 downstream of the blower 213 of the secondary turbocharger 206. The intake air cutoff valve 232 is a butterfly valve and is driven by a diaphragm type actuator 233. Further, the branch intake passage 212 is provided with a relief passage 234 which bypasses the blower 213. An intake air relief valve 235 is disposed in the relief passage 234.

The actuator 229 which drives the exhaust bypass valve 230 communicates with the branch intake passage 210 at the portion downstream of the blower 211 of the primary turbocharger 204 by way of a pipe 236. When the pressure in the branch intake passage 210 downstream of the blower 211 becomes not lower than a predetermined value, the actuator 229 opens the exhaust bypass valve 230, whereby a small amount of exhaust gas is fed to the turbine 207 of the secondary turbocharger 206 through the exhaust bypass passage 228 while the exhaust cutoff valve 223 is still in the closed state. Accordingly, the secondary turbocharger 206 begins to rotate before the exhaust cutoff valve 223 is opened.

The pipe 236 communicates with the branch intake passage 210 at the portion upstream of the blower 211 by way of a pipe 255 in which a duty solenoid valve 256 is disposed. The operating characteristics of the waste gate valve 227 and the exhaust bypass valve 230 are changed by changing the duty ratio of the duty solenoid valve 256.

The actuator 233 for driving the intake air cutoff valve 232 has a pressure chamber which is connected to the output port of a three-way solenoid valve 238 by way of a pipe 237. The actuator 231 for driving the exhaust cutoff valve 223 has a pressure chamber which is connected to the output port of another three-way solenoid valve 240 by way of a pipe 239. Further, the actuator 241 for driving the intake air relief valve 235 has a pressure chamber which is connected to the output port of a still another three-way solenoid valve 243 by way of a pipe 242. As will be described later, the intake air relief valve 235 keeps the relief passage 234 open until a predetermined time before the exhaust cutoff valve 223 and intake air cutoff valve 232 are opened, whereby the pressure upstream of the intake air cutoff valve 232 is prevented from increasing into the surging range when the secondary turbocharger 206 is pre-rotated by the exhaust gas flowing through the exhaust bypass passage 228, and the rotational speed of the blower 213 is increased.

Further, the actuator 226 for driving the waste gate valve 227 is connected to the output port of a still another three-way solenoid valve 245 by way of a pipe 244.

The three-way solenoid valves 238, 240, 243 and 245, the duty solenoid valve 256 and the fuel injection valves 219 and 220 are controlled by a control unit 246 comprising a microcomputer. Output signals of an engine speed sensor, the airflow meter 221, the pressure sensor 257 and the throttle sensor 258 are input into the control unit 246. Further signals representing the supercharging pressure P1 downstream of the blower 211 of the primary turbocharger 204 and the gear speed of the transmission are input into the control unit 246.

One input port of the three-way solenoid valve 238 for the intake air cutoff valve 232 is connected to a negative pressure reservoir 248 by way of a pipe 247, and the other input port is connected to an output port 270 of a differential pressure detecting valve 250 (to be described later) by way of a pipe 249. Negative pressure downstream of the throttle valve 216 is introduced into the negative pressure reservoir 248 by way of a check valve 251. One input port of the three-way solenoid valve 240 for the exhaust cutoff valve 223 opens to the atmosphere and the other input port is connected to the negative pressure reservoir 248 by way of a pipe 252 and the pipe 247. One input port of the three-way solenoid valve 243 for the intake air relief valve 235 is connected to the negative pressure reservoir 248 and the other intake port opens to the atmosphere. One input port of the three-way solenoid valve 245 for the waste gate valve 227 opens to the atmosphere and the other input port is connected to the pipe 236 by way of a pipe 254.

Figure 2:
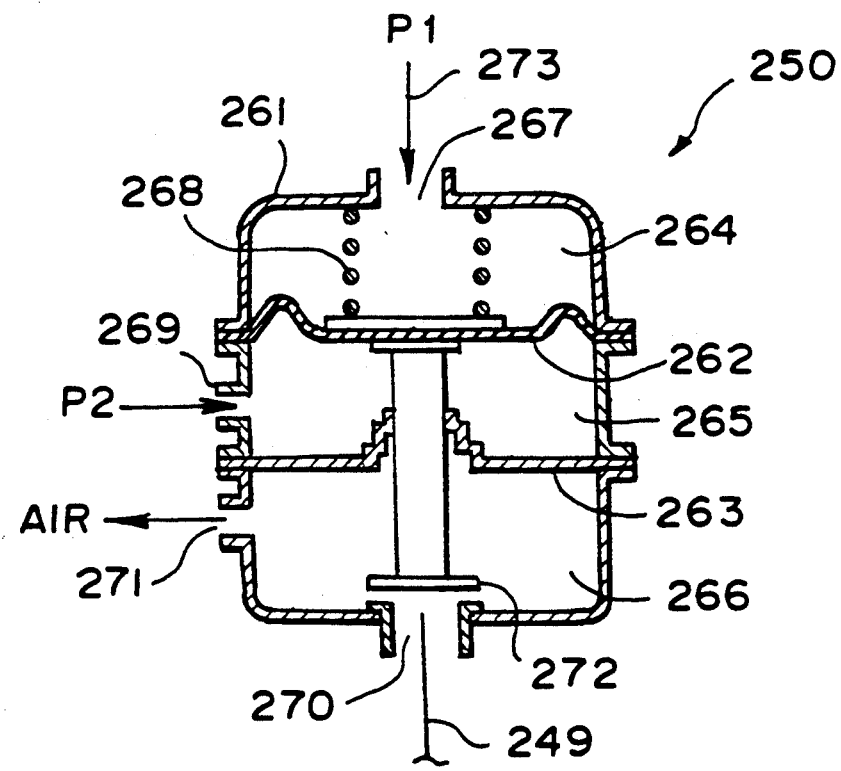
FIG. 2 is a cross-sectional view of the differential pressure detecting valve.

As shown in FIG. 2, the differential pressure detecting valve 250 has a casing 261 and the inner space of the casing 261 is divided into first to third chambers 264, 265 and 266 by first and second diaphragms 262 and 263. The first chamber 264 is provided with a first input port 267, and a compression spring 268 is disposed between the diaphragm 262 and the inner end face of the casing 261. The second or the middle chamber 265 is provided with a second input port 269. The third chamber 266 is provided with an output port 270 at the center of the end wall of the casing 261 and with a port which opens to the atmosphere at the side wall of the casing 261. A valve body 272 is fixed to the first diaphragm 262 at one end and extends through the second diaphragm 263 toward the output port 270.

As shown in FIG. 2, the first input port 267 is connected to a portion downstream of the intake air cutoff valve 232 by way of a pipe 273 and the supercharging pressure P1 downstream of the blower 211 of the primary turbocharger 204 is applied to the first chamber 264. The second intake port 269 is connected to a portion upstream of the intake air cutoff valve 232 by way of a pipe 274, and the pressure P2 upstream of the intake air cutoff valve 232 when the intake air cutoff valve 232 is closed is applied to the second chamber 265. When the difference between the pressure P1 and P2 (P2−P1) becomes not smaller than a predetermined value, the valve body 272 is moved away from the output port 270 to open it. The output port 270 is connected to the other input port of the three-way solenoid valve 238 for the intake air cutoff valve 232 by way of the pipe 249. Accordingly when the pressure P2 upstream of the intake air cutoff valve 232, i.e., the supercharging pressure of the secondary turbocharger 206 increases to approach the supercharging pressure P1 of the primary turbocharger 204 and to exceed the supercharging pressure P1 by a predetermined value (the pressure difference P2−P1 becomes larger than a predetermined value) with the three-way solenoid valve 238 being on and the pipe 237 which leads to the pressure chamber of the actuator 233 for the intake air cutoff valve 232 being in communication with the pipe 249 which leads to the output port of the differential pressure detecting valve 250, the pressure chamber of the actuator 233 is communicated with the atmosphere and the intake air cutoff valve 232 is opened. On the other hand, when the three-way solenoid valve 238 is turned off and the pipe 237 is communicated with the pipe 247 which leads to the negative pressure reservoir 248, negative pressure is applied to the pressure chamber of the actuator 233 and the intake air cutoff valve 232 is closed.

When the three-way solenoid valve 240 is turned off and the pipe 239 which leads to the pressure chamber of the actuator 231 is communicated with the pipe 252 which leads to the negative pressure reservoir 248, negative pressure is applied to the actuator 231 and the exhaust cutoff valve 223 is closed. When the three-way solenoid valve 240 is turned on and the pipe 239 is opened to the atmosphere, the exhaust cutoff valve 223 is opened and the secondary turbocharger 206 begins to operate.

When the three-way solenoid valve 243 is turned off and the pipe 242 which leads to the pressure chamber of the actuator 241 is communicated with the negative pressure reservoir 248, negative pressure is applied to the actuator 241 and the intake air relief valve 235 is opened. When the three-way solenoid valve 243 is turned on and the pipe 242 is opened to the atmosphere, the intake air relief valve 235 is closed.

While the three-way solenoid valve 245 is on, the actuator 226 for the waste gate valve 227 communicates with the downstream side of the blower 211 of the primary turbocharger 204, and when the pressure downstream of the blower 211 becomes not lower than a predetermined value, the actuator 226 opens the waste gate valve 227, thereby relieving exhaust gas to regulate the supercharging pressure. When the three-way solenoid valve 245 is turned off, the actuator 226 is opened to the atmosphere and closes the waste gate valve 227.

In this particular embodiment, each of the exhaust cutoff valve 223, the intake air cutoff valve 232 and the intake air relief valve 235 is opened and closed with hysteresis, as will become apparent later. Further, in order to prevent reverse flow of intake air to the blower 213 of the secondary turbocharger 206 in the case the exhaust cutoff valve 223 is kept closed and the intake air cutoff valve 232 is kept open when the operating condition of the engine shifts from the large intake air mass range to the small intake air mass range, the intake air cutoff valve 232 is forced to close a predetermined time (e.g., two seconds) after the exhaust cutoff valve 223 is closed.

The control unit 246 controls the three-way solenoid valves 238, 240, 243 and 245 to selectively open and close the intake air cutoff valve 232, exhaust cutoff valve 223, intake air relief valve 235 and waste gate valve 227 according to the map shown in FIG. 3. The map is stored in the control unit 246.

When the operating condition of the engine shifts from the small intake air mass range to the large intake air mass range, the intake air relief valve 235 is open in the range where the engine speed R is low or the intake air mass flow Q is small, and the secondary turbocharger 206 is pre-rotated by opening of the exhaust bypass valve 230. When the engine speed R increases to the value R2 or the intake air mass flow Q reaches Q2-R2 line, the three-way solenoid valve 243 is turned on and the intake air relief valve 235 is closed, whereby the pressure downstream of the blower 213 of the secondary turbocharger 206 increases until the exhaust cutoff valve 223 is opened. When the engine speed R increases to the value R4 or the intake air mass flow Q reaches Q4-R4 line, the three-way solenoid valve 240 is turned on and the exhaust cutoff valve 223 is opened. Further, when the engine speed R increases to the value R6 or the intake air mass flow Q reaches Q6-R6 line, the three-way solenoid valve 238 is turned on and the intake air cutoff valve 232 is opened, whereby the secondary turbocharger 206 begins to operate. That is, when the operating condition of the engine shifts across the Q6-R6 line, both the primary and secondary turbochargers 204 and 206 operate to supercharge the engine. The actuator 233 for driving the intake air cutoff valve 232 is not only governed by the three-way solenoid valve 238. That is, since the atmospheric pressure which causes the intake air cutoff valve 232 to open is fed to the actuator 233 by way of the differential pressure detecting valve 250, the intake air cutoff valve 232 actually opens a certain time after the three-way solenoid valve 238 is turned on. Accordingly, the Q6-R6 for shifting the three-way solenoid valve 238 for the intake air cutoff valve 232 from the off state to the on state is set taking into account the delay due to the differential pressure detecting valve 250, and as a result, the Q6-R6 line is set near the Q4-R4 line for shifting the three-way solenoid valve 240 for the exhaust cutoff valve 223 from the off state to the on state. The Q6-R6 line may be conformed to the Q4-R4 line.

When the operating condition of the engine shifts from the large intake air mass range to the small intake air mass range, the intake air cutoff valve 232, the exhaust cutoff valve 223 and the intake air relief valve 235 are switched when the operating condition of the engine shifts across Q5-R5 line, Q3-R3 line and Q1-R1 line shown by the broken line FIG. 3. That is, when the engine speed R decreases to the value R3 or the intake air mass flow Q decreases to the Q3-R3 line, the exhaust cutoff valve 223 is closed. Further, when the operating condition of the engine shifts into the small intake air mass range and the engine speed R decreases to the value R5 or the intake air mass flow Q decreases to the Q5-R5 line, the intake air cutoff valve 232 is closed. Then the intake air relief valve 235 is opened a certain time after the closure of the intake air cutoff valve 232. By closing the intake air cutoff valve 232 after a delay from the closure of the exhaust cutoff valve 223, occurrence of surging can be prevented when the operating condition of the engine shifts into the small intake air mass range.

In this embodiment, the three-way solenoid valve 245 for the waste gate valve 227 is turned on and off according to the same lines as for the three-way solenoid valve 240 for the exhaust cutoff valve 223. When the operating condition of the engine shifts from the small intake air mass range to the large intake air mass range, the three-way solenoid valve 245 is turned on when the engine speed R increases to the value R4 or the intake air mass flow Q increases to the Q4-R4 line, and when the operating condition of the engine shifts from the large intake air mass range to the small intake air mass range, the three-way solenoid valve 245 is turned off when the engine speed R decreases to the value R3 or the intake air mass flow Q decreases to the Q3-R3 line.

For example, when the throttle opening is increased by an amount larger than a predetermined amount and it is determined that shift of the operating condition of the engine from the small intake air mass range to the large intake air mass range is required, the three-way solenoid valve 245 is kept off to keep the waste gate valve 227 closed for a preset time T after the exhaust cutoff valve 223 is opened even if the engine speed R increases to the value R4 or the intake air mass flow Q increases to the Q4-R4 line. Thereafter, the three-way solenoid valve 245 is turned on to permit the waste gate valve 227 to open and close according to the pressure downstream of the blower 211 of the primary turbocharger 204.

In FIG. 3, the point at which each line is folded is on a so-called no-load line or road-load line.

In this embodiment, in the small intake air mass range, exhaust gas is not fed to the secondary turbocharger 206 and only the primary turbocharger 204 operates. Accordingly high supercharging pressure can be quickly obtained. In the large intake air mass range, both the primary and secondary turbochargers 204 and 206 operate and sufficient intake air mass flow and proper supercharging pressure can be obtained.

When it is determined that shift of the operating condition of the engine from the small intake air mass range to the large intake air mass range is required, the three-way solenoid valve 245 is kept off to keep the waste gate valve 227 closed for a preset time T after the exhaust cutoff valve 223 is opened, whereby the pressure of exhaust gas fed to the secondary turbocharger 206 is increased. Accordingly, the rotational speed of the secondary turbocharger 206 is quickly increased and the accelerating performance is improved. Further, since the waste gate valve 227 is permitted to open the preset time T after the exhaust cutoff valve 223 is opened, the supercharging pressure is prevented from increasing excessively high and torque shock does not occur.

FIG. 4 shows the relation between the operating condition of the engine and on and off of the three-way solenoid valves. As can be seen from FIG. 4, the hysteresis of opening and closure of the exhaust cutoff valve 223 is entirely included in the hysteresis of opening and closure of the intake air cutoff valve 232. Due to the differential pressure detecting valve 250, the intake air cutoff valve 232 is actually opened, as shown by the broken line, after a delay from the time the intake air cutoff valve 232 is turned on when the operating condition of the engine reaches the Q6-R6 line. Accordingly, the Q6-R6 line is set near the Q4-R4 line or is conformed to the Q4-R4 line. On the other hand, the intake air cutoff valve 232 is closed upon turning off the three-way solenoid valve 238 without such a delay. Accordingly, the values of Q5 and R5 should be Q5<Q3 and R5<R3.

Figure 5B:
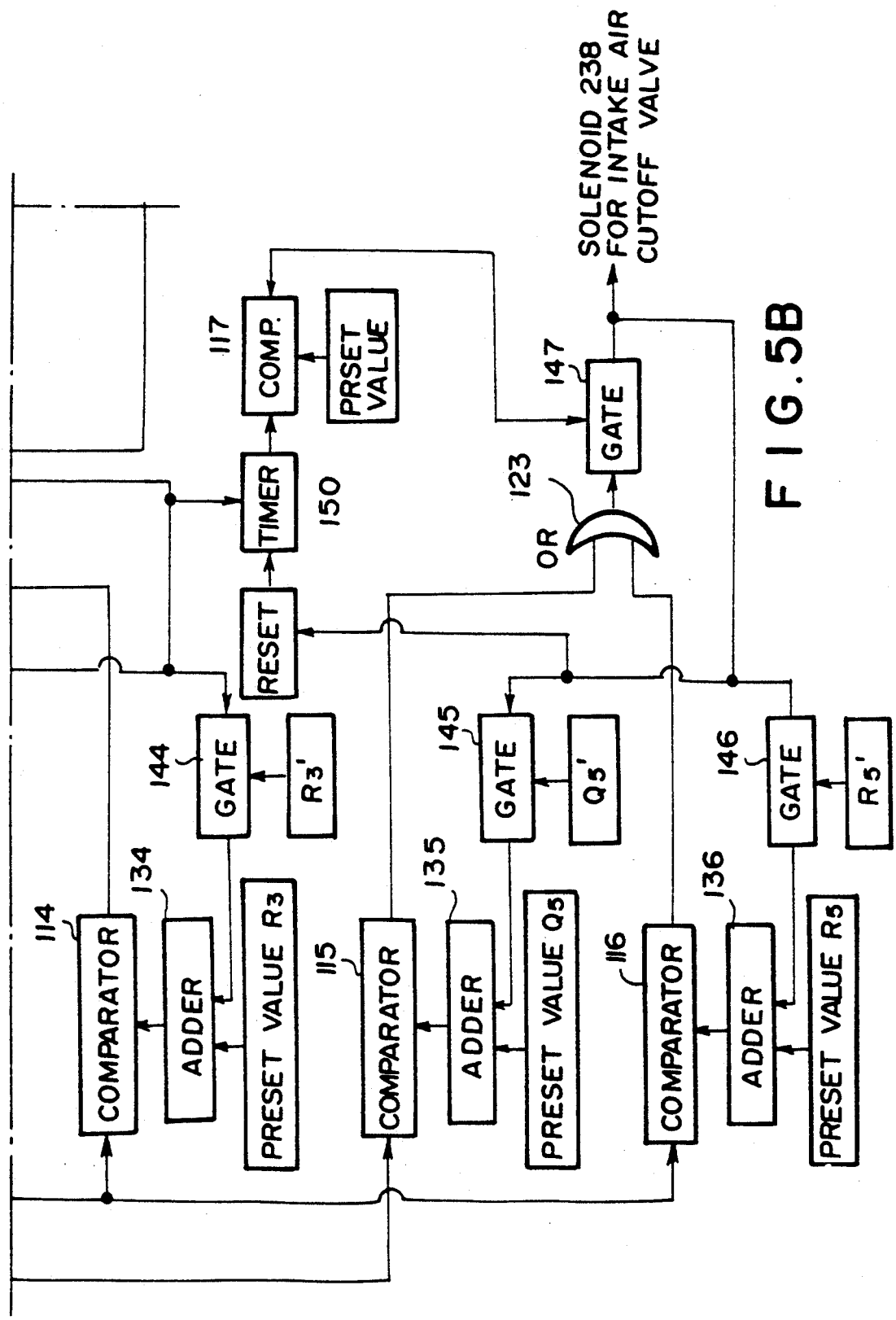
Figure 5C:
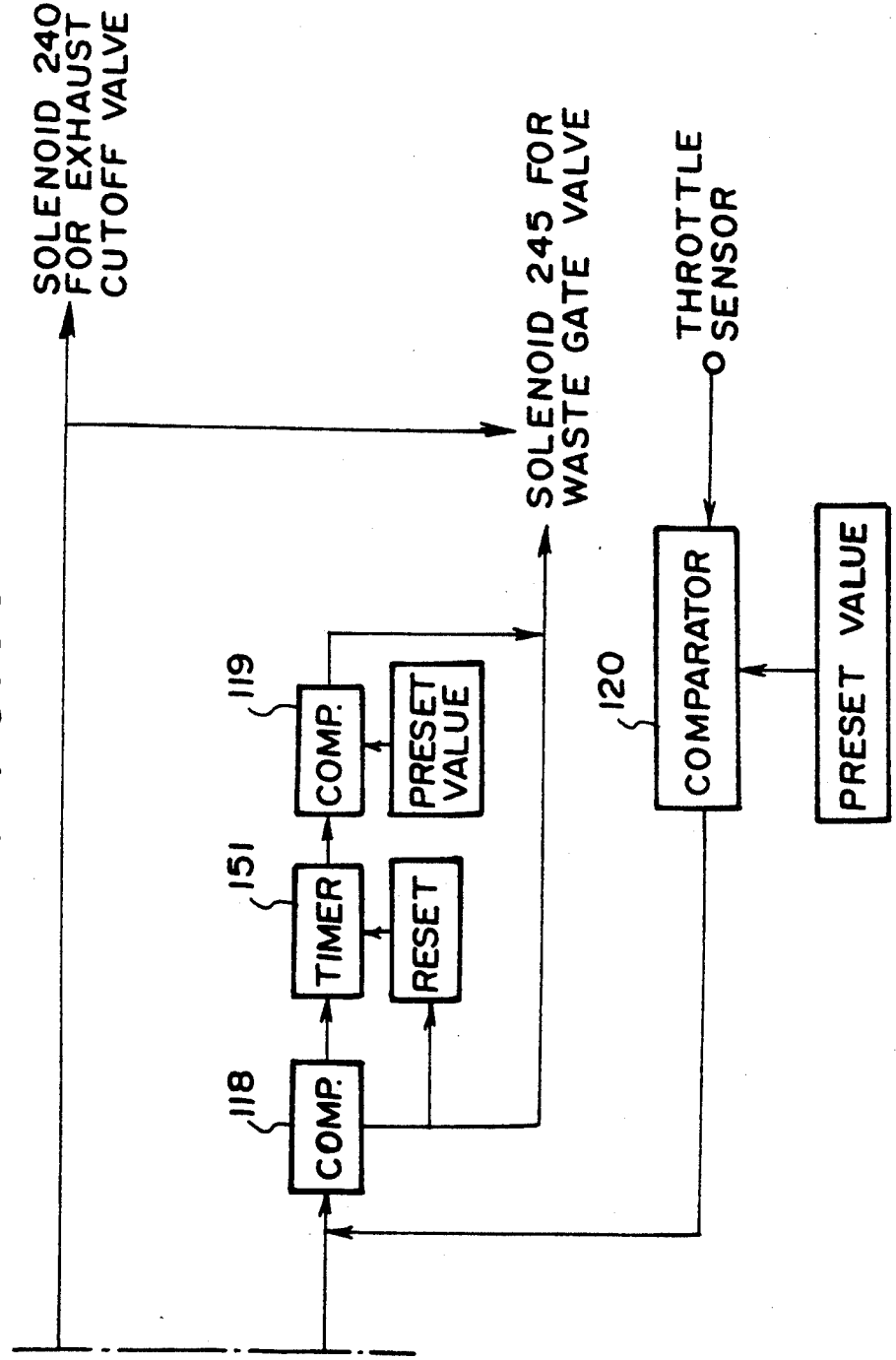

FIG. 5 shows a control circuit for controlling the valves. The three-way solenoid valve 243 for the intake air relief valve 235 is controlled by the output of a first OR circuit 121 in which the outputs of first and second comparators 111 and 112 are input. The first comparator 111 compares the intake air mass flow Q represented by the detecting signal of the airflow meter 221 with a reference value which is the output of a first adder 131. Into the first adder 131 is input a preset value Q1 which corresponds to an intake air mass flow on the Q1-R1 line in FIG. 3. Further a value Q'1 (Q1+Q'1=Q2) is input into the first adder 131 by way of a first gate 141. When the first gate 141 is opened, the first adder 131 outputs a value Q2 (Q1+Q'1=Q2) to the first comparator 111 as the reference value. On the other hand, when the first gate 141 is closed, the first adder 131 outputs the value Q1 to the first comparator 111 as the reference value. The first gate 141 is opened and closed by the output of the first OR circuit 121.

The second comparator 112 compares the engine speed R represented by the detecting signal of the engine speed sensor with a reference value which is the output of a second adder 132. Into the second adder 132 is input a preset value R1 which corresponds to an engine speed on the Q1-R1 line in FIG. 3. Further a value R'1 (R1+R'1=R2) is input into the second adder 132 by way of a second gate 142. When the second gate 142 is opened, the second adder 132 outputs a value R2 (R1+R'1=R2) to the second comparator 112 as the reference value. On the other hand, when the second gate 142 is closed, the second adder 132 outputs the value R1 to the second comparator 112 as the reference value. The second gate 142 is also opened and closed by the output of the first OR circuit 121.

The first and second comparators 111 and 112 compares the intake air mass flow Q and the engine speed R with the respective reference values which are the outputs of the first and second adders 131 and 132, and the first OR circuit 121 outputs an ON-signal to the three-way solenoid valve 243 to turn on it, thereby closing the intake air relief valve 235, when the intake air mass flow Q or the engine speed R becomes not smaller than the reference value. The first and second gates 141 and 142 are kept closed while the output of the first OR circuit 121 is the ON-signal and are kept open while the output of the first OR circuit 121 is the OFF-signal. Accordingly, when the operating condition of the engine shifts from the small intake air mass range to the large intake air mass range and the output of the first OR circuit 121 is the OFF-signal, the first and second gates 141 and 142 are open and the values Q2 and R2 are input into the respective first and second comparators 111 and 112 as the reference values. Thus when the operating condition reaches the Q2-R2 line FIG. 3, the ON-signal is output and the intake air relief valve 235 is opened. The ON-signal causes the first and second gates 141 and 142 to close and the values Q1 and R1 are input into the respective comparators 111 and 112 as the reference values. In this manner, the line Q1-R1 for the shift of the operating condition of the engine in the reverse direction is set with a hysteresis corresponding to the values Q'1 and R'1.

The three-way solenoid valve 240 for the exhaust cutoff valve 223 is controlled by the similar circuit. That is, a third comparator 113 is provided for the intake air mass flow Q and a fourth comparator 114 is provided for the engine speed R, and the outputs of the comparators 113 and 114 are connected to the three-way solenoid valve 240 by way of a second OR circuit 122. The third comparator 113 is provided with a third adder 133 and the fourth comparator 114 is provided with a fourth adder 134. A preset value Q3 is input into the third comparator 133 and a value Q'3 (Q3+Q'3=Q4) is input into the third comparator 113 by way of a third gate 143. Similarly, a preset value R3 is input into the fourth comparator 134 and a value R'3 (R3+R'3=R4) is input into the fourth comparator 114 by way of a fourth gate 144. This circuit operates in the similar manner to that for the three-way solenoid valve 243 for the intake air relief valve 235, and the exhaust cutoff valve 223 is opened when the operating condition of the engine shifts across the Q4-R4 line to the large intake air mass range and is closed when the operating condition of the engine shifts across the Q3-R3 line to the small intake air mass range.

Similarly the three-way solenoid valve 238 for the intake air cutoff valve 232 is controlled by a circuit which comprises fifth and sixth comparators 115 and 116, a third OR circuit 123, fifth and sixth adders 135 and 136, and fifth and sixth gates 145 and 146 and operates substantially in the same manner as the circuits for the three-way solenoid valves 243 and 240. By this circuit, the intake air cutoff valve 232 is opened when the operating condition of the engine shifts across the Q6-R6 line to the large intake air mass range and is closed when the operating condition of the engine shifts across the Q5-R5 line to the small intake air mass range, wherein Q6=Q5+Q'5 and R6=R5+R'5.

In the case of the circuit for controlling the intake air cutoff valve 232, a seventh gate 147 is interposed between the third OR circuit 123 and the three-way solenoid valve 238. A timer 150 begins to count up at the time the output of the second OR circuit 122 (for the exhaust cutoff valve 223) changes from the ON-signal to the OFF-signal, and a seventh comparator 117 outputs an ON-signal when the count of the timer 150 exceeds a preset value (e.g., the value corresponding to 2 seconds). When the seventh comparator 117 outputs the ON-signal, the seventh gate 147 is closed and the intake air cutoff valve 232 is closed. At the same time, the reference values for the intake air mass flow Q and the engine speed R are changed to the values Q6 and R6 and the timer 150 is reset. Though the output of the seventh comparator 117 turns into the OFF-signal when the seventh gate 147 is once closed, the intake air cutoff valve 232 is kept closed because the reference values have changed to Q6 and R6. With this arrangement, surging which can occur when the three-way solenoid valve 240 for the intake air cutoff valve 232 is kept on for a long time with the three-way solenoid valve 238 for the exhaust cutoff valve 223 being off during shift of the operating condition of the engine into the small intake air mass range is prevented.

The circuit for controlling the waste gate valve 227 will be described, hereinbelow. The output of the second OR circuit 122 which is input into the three-way solenoid valve 240 for the exhaust cutoff valve 223 is also input into the three-way solenoid valve 245 for the waste gate valve 227. That is, when the operating condition of the engine shifts across the Q4-R4 line to the large intake air mass range, the three-way solenoid valve 245 is turned on to permit the waste gate valve 227 to open and close according to the pressure downstream of the blower 211 of the primary turbocharger 204, and when the operating condition of the engine shifts across the Q3-R3 line to the small intake air mass range, the three-way solenoid valve 245 is turned off to close the waste gate valve 227.

The output signal of the throttle sensor 258 is input into a tenth comparator 120. The tenth comparator 120 determines whether the output signal of the throttle sensor 258 has exceed a predetermined value. When the tenth comparator 120 determines that the output signal of the throttle sensor 258 has exceed the predetermined value, i.e., when it is determined that shift to the large intake air mass range is required, an eighth comparator 118 determines whether the output of the second comparator 122 has changed from the OFF-signal to the ON-signal. When it is determined that the output of the second OR circuit 122 has changed from the OFF-signal to the ON-signal, the eighth comparator 118 outputs the OFF-signal to the three-way solenoid valve 245 for a predetermined time after the output of the second OR circuit 122 changes to the OFF-signal or the exhaust cutoff valve 223 is opened. That is, at the time the eighth comparator 118 begins to output the OFF-signal, a timer 151 begins to count up and when the count of the timer 151 exceeds a preset value T, a ninth comparator 119 delivers the ON-signal to the three-way solenoid valve 245 instead of the OFF-signal output from the eighth comparator 118. The timer 151 is reset when the output of the second comparator 122 has changed from the ON-signal to the OFF-signal.

The preset value T may be changed according to the operating condition of the engine.

Figure 7A:
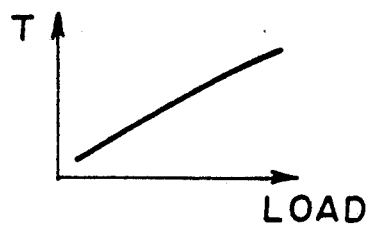
FIGS. 7a to 7e are views showing the relations between the preset value T and the various factors.
Figure 7B:
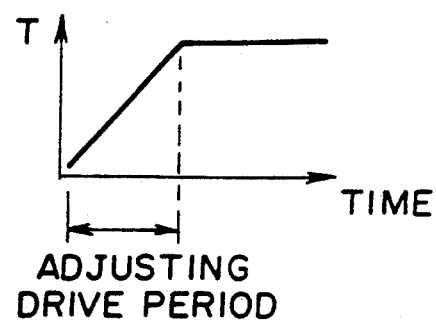

For example,

1. The preset value T is increased as the engine load increases as shown in FIG. 7a. That is, since the heavier the engine load is, the more quickly the rotational speed of the secondary turbocharger 206 is required to increase, it is preferred that the waste gate valve 227 be closed for a longer time so that the rotational speed of the secondary turbocharger 206 increases at a higher rate.
2. The preset value T is reduced when the total trip mileage is smaller than a predetermined value as shown in FIG. 7b. When the total trip mileage of the car is very small and so-called adjusting drive is required, it is preferred that the supercharging pressure be prevented from increasing excessively high in order to protect the engine.

Figure 7C:
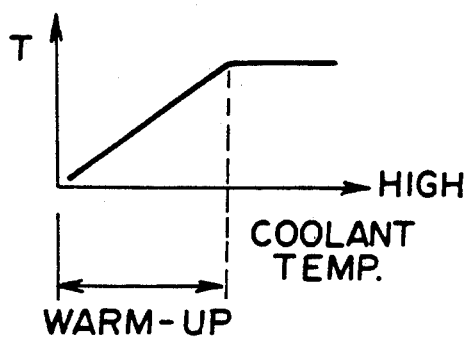

3. When the temperature of the engine coolant is lower than a predetermined value, the preset value T is reduced as shown in FIG. 7c in order to protect the engine.

Figure 7D:
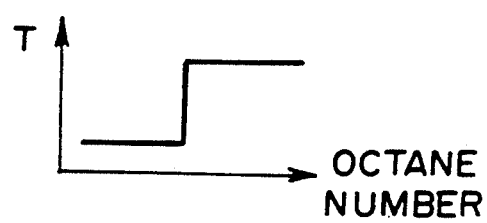

4. When a knock sensor or the like detects that the car requires high-octane gasoline and nevertheless it has been loaded with low-octane gasoline, the preset value T is reduced as shown in FIG. 7d in order to prevent occurrence of knock and protect the engine.

Figure 7E:
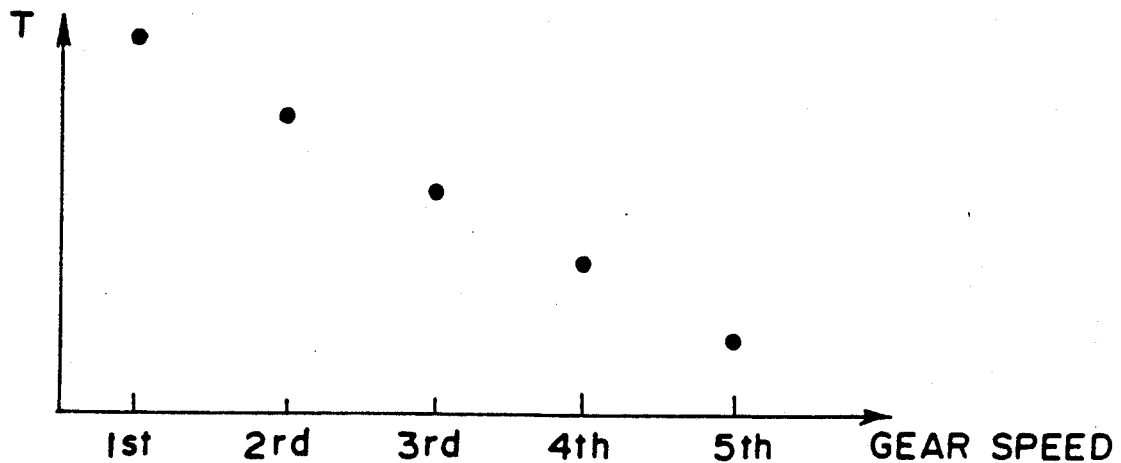

5. The preset value is changed according to the gear speed as shown in FIG. 7e.

In the case of an automatic transmission vehicle, the three-way solenoid valve 245 for the waste gate valve 27 may be turned on upon kick down so that it can open before the exhaust cutoff valve 223 opens. With this arrangement, the difference between the pressures downstream and upstream of the exhaust cutoff valve 223 reduces and the exhaust cutoff valve 223 can open more quickly.

Though, in the embodiment described above, the waste gate valve 227 is kept closed for a predetermined time after the exhaust cutoff valve 223 is opened, it may be kept closed until the supercharging pressure which is detected by the pressure sensor 257 exceeds a predetermined value. In this case, the predetermined time corresponds to the time the supercharging pressure takes to increase to the predetermined value.

Until the supercharging pressure exceeds the predetermined value after the exhaust cutoff valve 223 opens, the waste gate valve 227 cannot open, and accordingly, the pressure of exhaust gas fed to the secondary turbocharger 206 increases and the rotational speed of the turbocharger 206 quickly increases, whereby the accelerating performance is improved.

After the supercharging pressure exceeds the predetermined value, the waste gate valve 227 can open to relive exhaust gas and accordingly, over-supercharging is prevented, whereby occurrence of torque shock is prevented.

Figure 6:
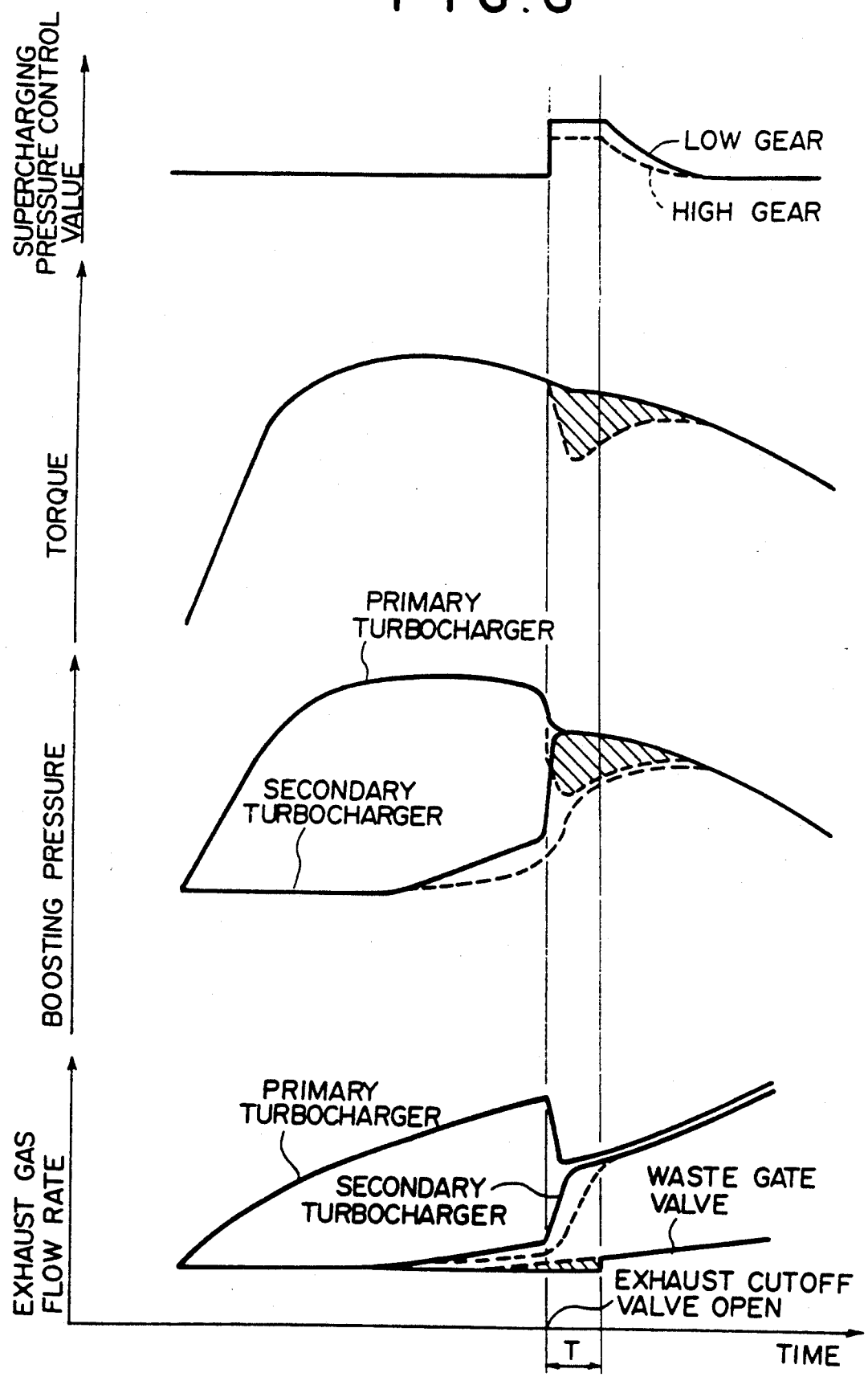
FIG. 6 shows the change with time in the exhaust gas flow rate, the boosting pressure, the torque and the supercharging pressure control value when the operating condition of the engine shifts from the small intake air mass range to the large intake air mass range.

As shown in FIG. 6, since the waste gate valve 227 is kept closed for the predetermined time T after the exhaust cutoff valve 223 is opened, the amount of exhaust gas fed to the secondary turbocharger 206 is increased, and accordingly, the boosting pressure of the secondary turbocharger is increased so that the difference in the boosting pressure between the primary and secondary turbochargers 204 and 206 is reduced, whereby reverse flow intake air from the primary turbocharger side to the secondary turbocharger side is suppressed and the boosting pressure of the primary turbocharger 204 is also increased. Thus drop in torque is suppressed. In FIG. 6, the parts of the torque curve, the boosting pressure curve and the exhaust gas flow rate curve shown by the broken line ar those in the conventional system.

The duty ratio of the duty solenoid valve 256 is set larger (the effective opening is large) when the gear-speed of the transmission is high and smaller when the gear-speed of the transmission is low. That is, when the transmission is in high gear, acceleration is relatively small and increase in the engine speed is relatively slow, and accordingly, the effective opening of the duty solenoid valve is increased so that the supercharging pressure fed to the waste gate valve 227 is relieved in a large amount and is reduced int its value. On the other hand, when the transmission is in low gear, acceleration is relatively large and increase int he engine speed is relatively quick, and accordingly, the effective opening of the duty solenoid valve is reduced so that the supercharging pressure fed to the waste gate valve 227 is hardly relieved and is increased in its value. With this arrangement, the period between the time the exhaust cutoff valve 223 begins to open and the time the waste gate vale 277 beings to open can be made substantially constant.

We claim:

1. An exhaust control system for an engine for a vehicle provided with at least one primary turbocharger and at least one secondary turbocharger, the primary turbocharger and the secondary turbocharger having blowers disposed in the intake passage of the engine in parallel to each other and turbines disposed in the exhaust passage of the engine in parallel to each other, an air mass flow detecting means which detects air mass flow into the engine, and with an exhaust cutoff valve which is disposed in the exhaust passage, a control means which opens the exhaust cutoff valve in accordance with output of the air mass flow detecting means to feed exhaust gas to the turbine of the secondary turbocharger only when a large intake air mass range is detected by the air mass flow detecting means, and a waste gate vale which opens and closes a waste gate passage between upstream and downstream ends of the turbines according to the supercharging pressure and ones to relive exhaust gas fed to the turbochargers when the supercharging pressure exceeds a predetermined value, characterized by having a relief inhibiting means which prohibits the waste gate valve from opening for a predetermined time after the operating condition of the engine shifts into the large intake air mass range and the exhaust cutoff valve opens when shift of the operating cond'tion of the engine form a small intake air mass range to the large intake air mass range is required.

2. An exhaust control system as defined in claim 1 in which said predetermined time is charged according to a change in a factor which affects a change in the operating condition of the engine.

3. An exhaust control system as defined in claim 1 in which said predetermined time is elongated with increase in the engine load.

4. An exhaust control system as defined in claim 1 in which the smaller the total trip mileage of the vehicle is, the shorter said predetermined time is until the total trip mileage reaches a predetermined value.

5. An exhaust control system as defined in claim 1 in which the lower the engine coolant temperature is, the shorter said predetermined time is until the engine coolant temperature reaches a predetermined value.

6. An exhaust control system as defined in claim 1 in which said predetermined time is elongated as the octane number of fuel fed to the engine increases.

7. An exhaust control system as defined in claim 1 in which said predetermined time is shortened as the gear speed of the transmission becomes higher.

8. An exhaust control system for an engine for a vehicle provided with at lest one primary turbocharger and at least one secondary turbocharger, the primary turbocharger and the secondary turbocharger having blowers disposed in the intake passage of the engine in parallel to each other and turbines disposed in the exhaust passage of the engine is parallel to each other, an air mass flow detecting means which detects air mass flow into the engine, and with an exhaust cutoff valve which is disposed int he exhaust passage, a control means which opens the exhaust cutoff valve in accordance with output of the air mass flow detecting means to feed exhaust gas to the turbine of the secondary turbocharger only when a large intake air mass range is detected by the air mass flow detecting means, and a waste gate valve which opens and closes a waste gate passage between upstream and downstream ends of the turbine according to the supercharging pressure and opens to relive exhaust gas fed to the turbochargers when the supercharging pressure exceeds, a predetermined value, characterized by having a relief inhibiting means which prohibits the waste valve from oepnign for a predetermined time after the exhaust cutoff valve opens.

* * * * *